United States Patent
DeLizo et al.

(10) Patent No.: US 11,804,672 B2
(45) Date of Patent: Oct. 31, 2023

(54) MECHANIZED TRAILER CONNECTOR

(71) Applicant: PACCAR Inc, Bellevue, WA (US)

(72) Inventors: Stan DeLizo, Lynnwood, WA (US); Yen-Lin Han, Seattle, WA (US); Benjamin M. Cross, Enumclaw, WA (US); Trevor R. Hart, Carnation, WA (US); Sahm Noorfeshan, Snohomish, WA (US); Owen F. Van Valkenburgh, Portland, OR (US)

(73) Assignee: PACCAR Inc., Bellevue, WA (US)

( * ) Notice: Subject to any disclaimer, the term of this patent is extended or adjusted under 35 U.S.C. 154(b) by 160 days.

(21) Appl. No.: 17/335,586

(22) Filed: Jun. 1, 2021

(65) Prior Publication Data
US 2022/0384990 A1 Dec. 1, 2022

(51) Int. Cl.
*H01R 13/629* (2006.01)
*B25J 19/00* (2006.01)
*B25J 11/00* (2006.01)
*H01R 13/447* (2006.01)
*H01R 13/516* (2006.01)
*B60D 1/60* (2006.01)
*B60D 1/64* (2006.01)
*H01R 13/627* (2006.01)

(52) U.S. Cl.
CPC ............ *H01R 13/629* (2013.01); *B25J 11/00* (2013.01); *B25J 19/0025* (2013.01); *B60D 1/605* (2013.01); *B60D 1/64* (2013.01); *H01R 13/447* (2013.01); *H01R 13/516* (2013.01); *H01R 13/6272* (2013.01); *H01R 2201/26* (2013.01)

(58) Field of Classification Search
CPC .. H01R 13/629; H01R 13/447; H01R 13/516; H01R 13/6272; H01R 2201/26; B25J 11/00; B25J 19/0025; B60D 1/605; B60D 1/64
See application file for complete search history.

(56) References Cited

U.S. PATENT DOCUMENTS

| 4,620,362 A | 11/1986 | Reynolds |
| 5,108,140 A | 4/1992 | Bartholet |

(Continued)

FOREIGN PATENT DOCUMENTS

| CN | 107732569 A | * | 2/2018 | ............. B25J 11/00 |
| WO | 2017/091433 | | 6/2017 | |

OTHER PUBLICATIONS

Seattle U, Projects day 2019 Event Schedule, accessed online at: https://www.seattleu.edu/media/college-of-science-and-engineering/files/projectcenter/SU_Projects-Day-Book_2019.pdf, 2019, 17 pages.
(Continued)

*Primary Examiner* — Tho D Ta
(74) *Attorney, Agent, or Firm* — Merchant & Gould P.C.

(57) ABSTRACT

The present technology describes systems and methods for power coupling of a tractor-trailer system. The technology may include a robotic arm, an end effector, a coupling tool, and a tool resting rack. An electrical outlet on a trailer may be coupled with a tool under control of the end effector and positioning of the robotic arm. The end effector may include a housing, a motor, a clutch, and a drive shaft. A tool coupled to the end effector may include an electro-mechanical (EM) coupler. The EM coupler may include a housing, an electric plug, a lid lifter, a lead screw, and a servomotor.

20 Claims, 11 Drawing Sheets

(56) References Cited

U.S. PATENT DOCUMENTS

| | | | |
|---|---|---|---|
| 2013/0277943 A1 | 10/2013 | Wendte | |
| 2019/0302764 A1 | 10/2019 | Smith | |
| 2021/0053407 A1* | 2/2021 | Smith | ................... B25J 9/1697 |
| 2021/0379945 A1 | 12/2021 | DeLizo | |
| 2021/0380182 A1 | 12/2021 | DeLizo | |

OTHER PUBLICATIONS

PCT International Search Report and Written Opinion in International Application PCT/US2021/035231, dated Sep. 1, 2021, 10 pgs.

PCT International Preliminary Report on Patentability in International Application PCT/US2021/035231, dated Dec. 15, 2022, 7 pgs.

* cited by examiner

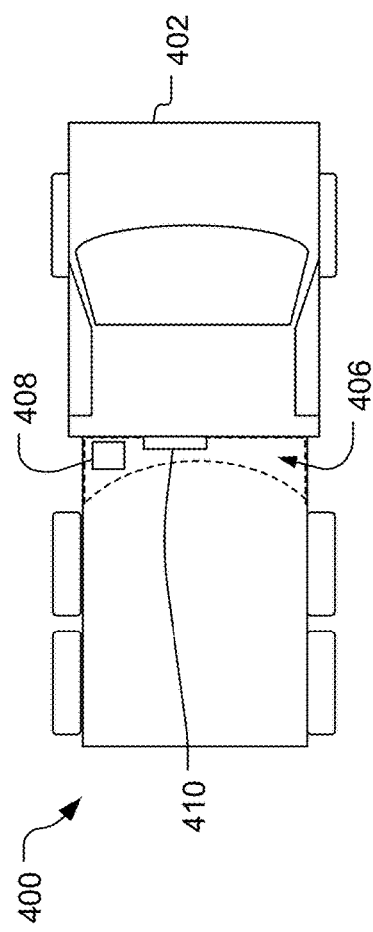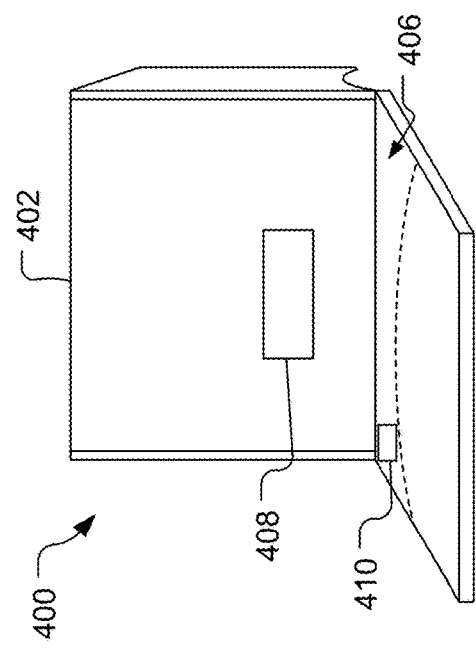
FIG. 4A
FIG. 4B

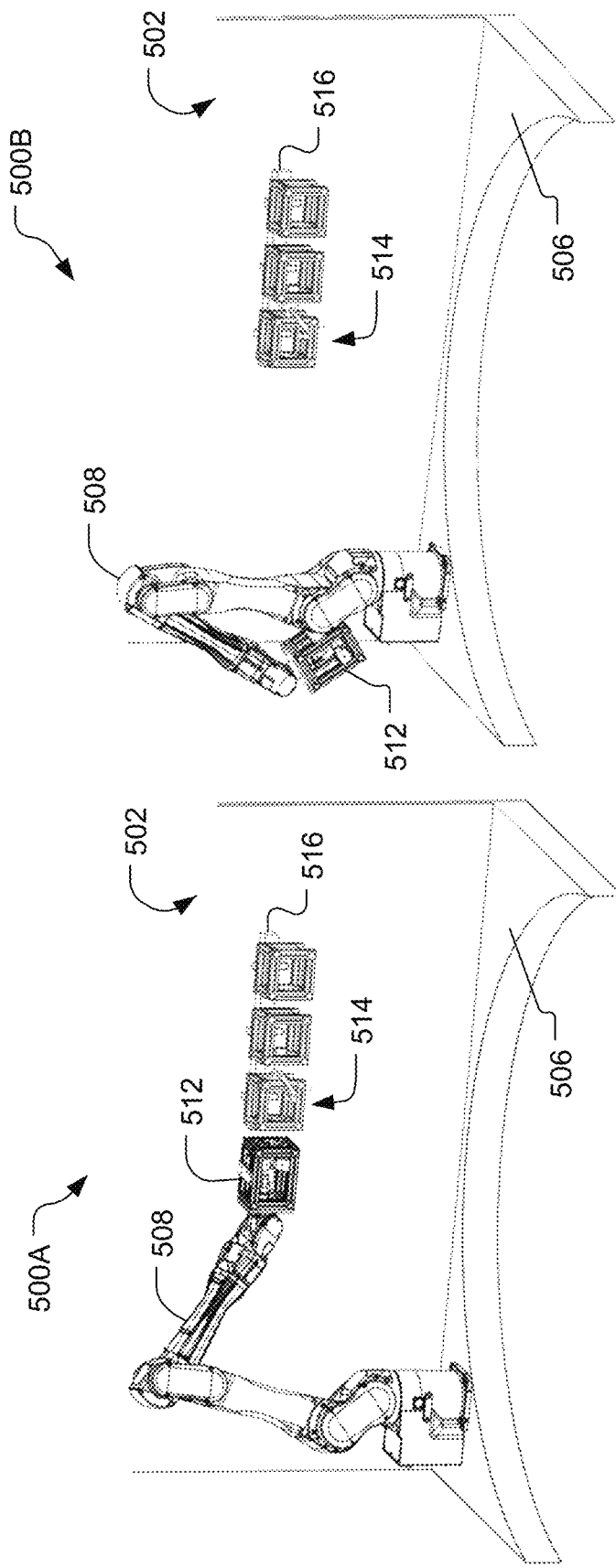

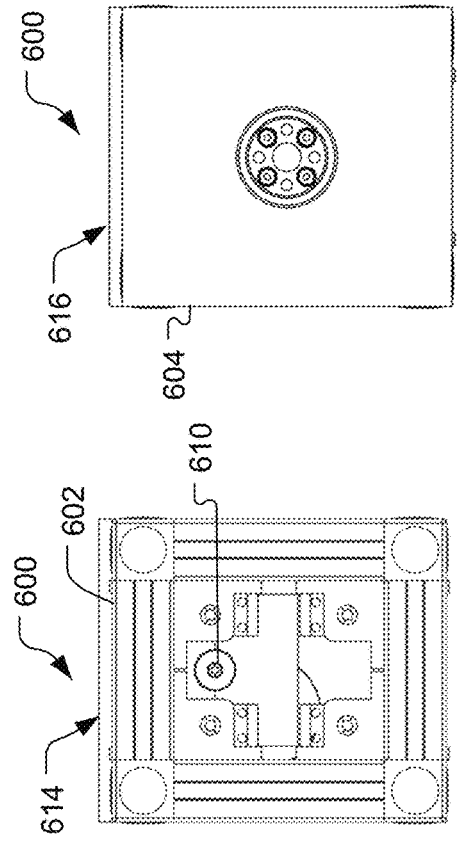
FIG. 6B
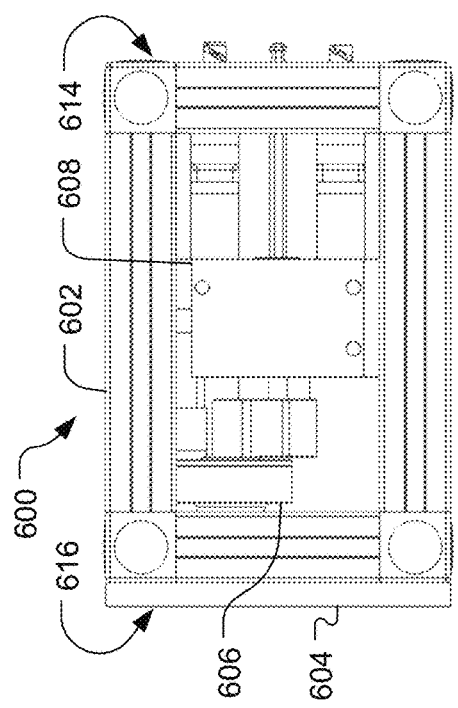
FIG. 6A
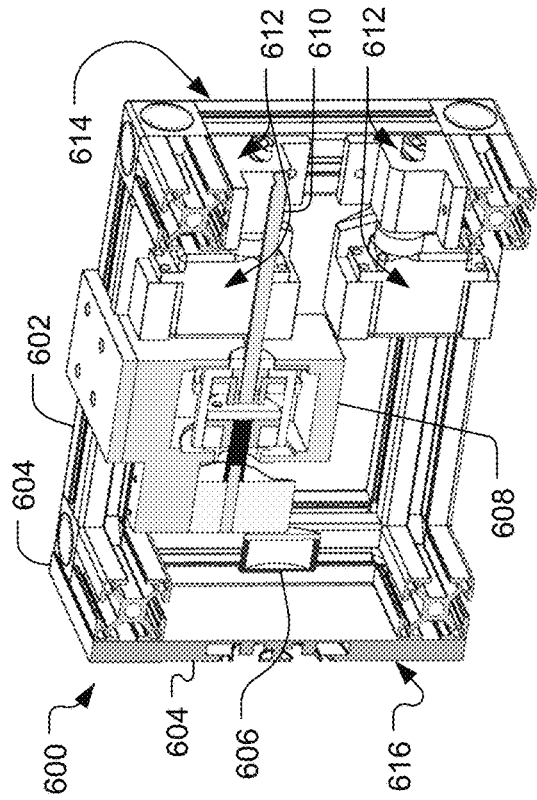
FIG. 6C
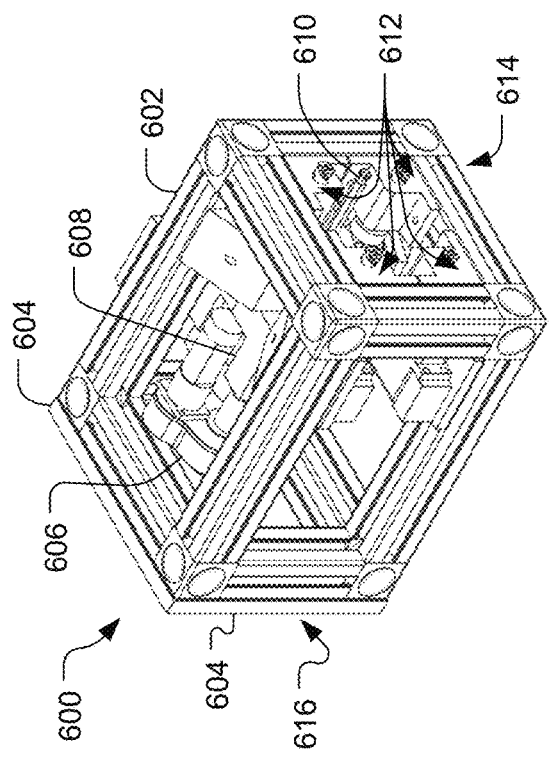
FIG. 6E
FIG. 6D

MECHANIZED TRAILER CONNECTOR

CROSS-REFERENCE TO RELATED APPLICATIONS

This application claims the benefit of U.S. Provisional Application No. 63/035,089, filed Jun. 5, 2020, the complete disclosure of which is hereby incorporated herein by reference in its entirety.

BACKGROUND

Vehicles are shifting towards self-automation and self-driving modes. In particular, various aspects of tractor-trailer systems are also being automated. One such process is the connection of tractor-trailer pneumatic and electric lines. Often, each tractor is equipped with a pneumatic hose and an electrical line to be connected prior to vehicle movement.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

The present technology relates to a mechanized trailer connector. In an aspect, an electro-mechanical (EM) coupler is disclosed. The EM coupler includes a housing, a lead screw inside the housing, an electric plug inside the housing movable along the lead screw, a servomotor inside the housing, and a lid lifter controlled by the servomotor, the lid lifter configured to lift a lid of an electrical outlet.

In an example, movement of the electric plug along the lead screw is controlled from a drive line connector. In another example, power is provided to the servomotor from a receiving plate of the electro-mechanical coupler, and the receiving plate is electrically coupled to an end effector. In a further example, the housing is a skeletal rectangular prism. In yet another example, the electric plug is configured to lock into the lid of the electrical outlet. In still a further example, the electric plug is electrically coupled to a vehicle and the electrical outlet is electrically coupled to a trailer. In another example, the electric plug is movable along the lead screw to extrude outside of the housing. In a further example, the housing includes an insertion element configured to be received at a tool resting rack.

In another aspect, an end effector is disclosed. The end effector includes a housing defining a first side and an opposite second side and an attachment plate positioned at the first side capable of coupling with a movement device. The end effector also includes a mating system positioned at the second side capable of coupling with a tool, a motor inside the housing, a clutch inside the housing coupled to the motor, and a drive shaft inside the housing coupled to the motor.

In an example, the movement device is a robotic arm. In another example, the robotic arm is coupled to a vehicle. In a further example, power is provided from the robotic arm to the end effector via the attachment plate. In yet another example, the mating system provides power to the tool. In still a further example, the mating system enables control of a feature of the tool.

In a further aspect, a power coupling assembly is disclosed. The power coupling assembly includes an electro-mechanical coupler and an end effector. The electro-mechanical coupler includes a first housing, a lead screw inside the first housing, an electric plug inside the first housing movable along the lead screw, a servomotor inside the first housing, and a lid lifter controlled by the servomotor, the lid lifter configured to lift a lid of an electrical outlet. The end effector includes a second housing with a first side, a mating system positioned at the first side capable of coupling with the electro-mechanical coupler, and a motor inside the second housing controlling a drive shaft.

In an example, power is provided from the end effector to the electro-mechanical coupler. In another example, the drive shaft is rotatably coupled to the lead screw via the mating system. In a further example, movement of the electric plug along the lead screw is based on the motor of the end effector. In yet another example, movement of the electric plug along the lead screw is controlled to insert the electric plug into the electrical outlet. In still a further example, the lid lifter is movable in an upward swing to lift the lid of the electrical outlet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 4A-4B depict example footprint locations of a robotic arm for automated trailer connection and a tool resting rack.

FIGS. 5A-5B depict two configurations of an example robotic arm for automated trailer connection and a tool resting rack.

FIGS. 6A-E depict different perspectives of an example end effector couplable to a robotic arm.

Figure 1:
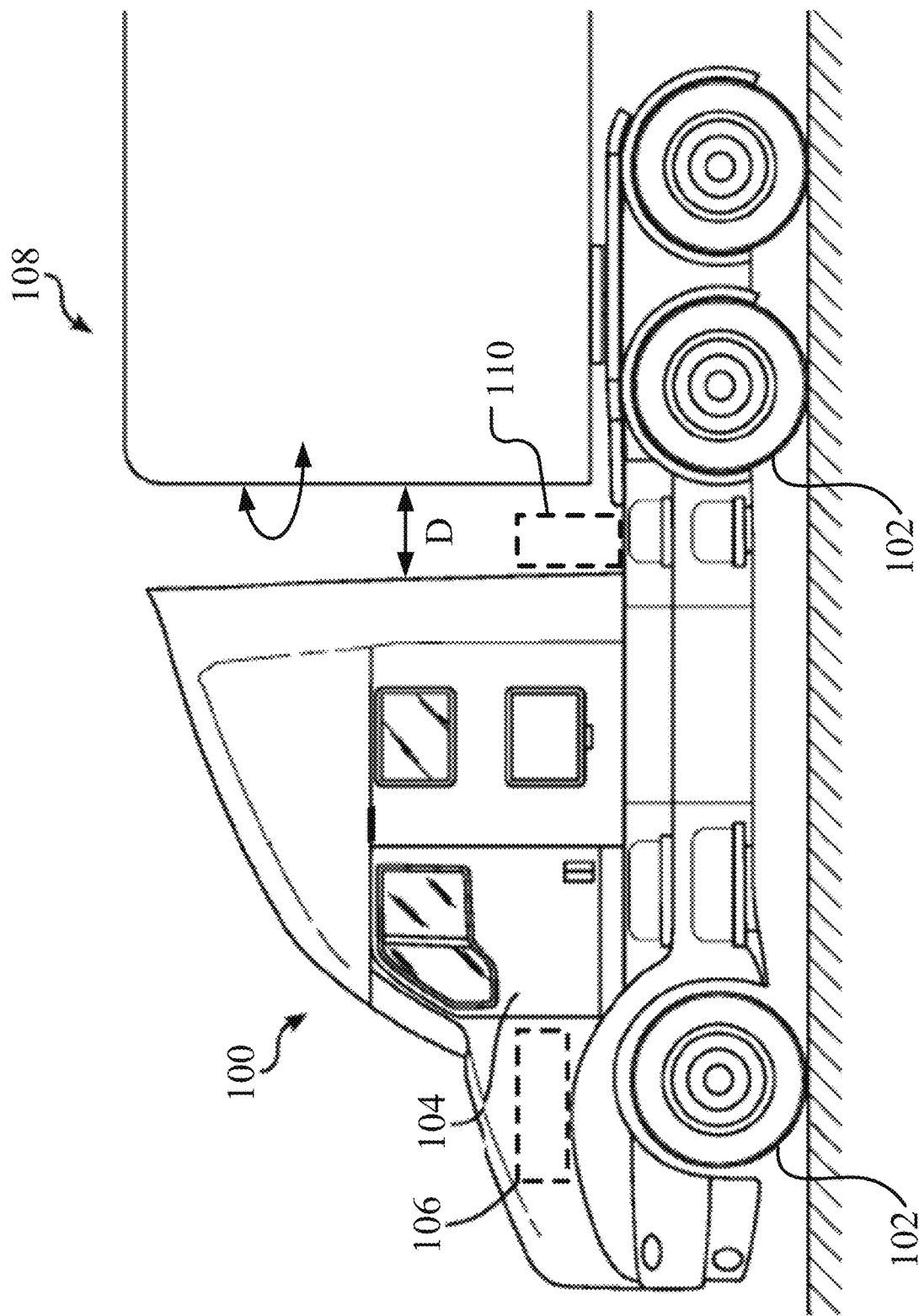
FIG. 1 depicts a side view of a vehicle.

While examples of the disclosure are amenable to various modifications and alternative forms, specific aspects have been shown by way of example in the drawings and are described in detail below. The intention is not to limit the scope of the disclosure to the particular aspects described.

DETAILED DESCRIPTION

Vehicles are shifting towards self-automation and self-driving modes. In particular, various aspects of tractor-trailer systems are also being automated. One such process is the connection of tractor-trailer pneumatic and electric lines. Often, each tractor is equipped with a pneumatic hose and an electrical line to be connected prior to vehicle movement. Connecting these lines has previously been done manually by the truck operator, and often requires a high level of dexterity and force to hook up the lines. The ability to automatically connect air and electric lines is a critical step in having an autonomous tractor-trailer combination that eliminates, or at least reduces, the need for driver intervention.

The process requires the airlines' connectors, gladhands, and the electric line to be moved and secured to the front of the trucks' gladhand/electrical configuration. For a successful connection, the airlines are rotated and/or torqued into position and sealed to maintain operational pressure (e.g., 140 psi), and the electrical plug is pushed into its socket. Of the variety of connections, the present disclosure focuses on the connection of the electric line(s), although the present disclosure may be applied to a variety of connections. Aspects of identifying and connecting airline connectors and gladhands are further described in U.S. Provisional Application No. 63/035,089, filed Jun. 5, 2020, the entirety of which is hereby incorporated by reference.

A proposed solution to connecting electric line(s) is detecting and locating an electrical outlet on a trailer, aligning an electro-mechanical (EM) coupler with the electrical outlet (e.g., using a robotic arm), and controlling the EM coupler (e.g., with an end effector positioned between the EM coupler and the robotic arm) to electrically couple the trailer with power from the truck via the EM coupler. Identification and location of an electrical outlet, and alignment of a robotic arm/EM coupler with the electrical outlet may use image processing and one or more cameras. Image processing and alignment of automated and semi-automated components with a trailer configuration are further described in U.S. Provisional Application No. 63/035,089, filed Jun. 5, 2020, the entirety of which is hereby incorporated by reference. Although the present disclosure discusses components operating to connect lines of a vehicle to a trailer (vehicle-side), it should be appreciated that the components may be independent of the vehicle and/or trailer or may be operable to connection the trailer to lines of the vehicle (trailer-side).

FIG. 1 depicts a side view of a vehicle 100. In the example depicted, the vehicle 100 is a truck with a chassis supported by wheels 102. The vehicle 100 may be a part of a tractor-trailer combination, or tractor-trailer system, which may include the vehicle 100 having a so-called fifth wheel by which a box-like, flat-bed, or tanker semi-trailer 108 (among other examples) may be attached for transporting cargo or the like. A distance D may be seen between the vehicle 100 and a trailer 108 when the vehicle 100 and the trailer 108 are aligned. The distance D varies, however, when the vehicle 100 and the trailer 108 are not aligned, such as when the vehicle 100 is turning (sometimes referred to herein as "trailer swing"). Limited clearance may exist between the trailer 108 and the point of connection on the vehicle 100. While the vehicle 100 is depicted as a truck in FIG. 1, it should be appreciated that the present technology is applicable to any type of vehicle where power connections are required or desired.

The example vehicle 100, otherwise referred to herein as a truck, tractor, or cab, includes a cabin 104 from which a driver may steer the vehicle 100. The vehicle may include a power and control system 106 to operate the vehicle 100. The trailer 108 may include an electrical outlet to allow coupling of power with the trailer 108 to, for example, provide power to lights on or in the trailer 108. Manual coupling of the vehicle electrical ports with the trailer 108 may take a substantially amount of a driver's time and/or may result in physical exertion of the driver to reach connection sites. According to the present technology, a robotic arm may be provided in a clear workspace 110 of the vehicle 100 to automate or semi-automate a power connection between the vehicle 100 and the trailer 108 without user intervention (e.g., by using an end effector and EM coupler described herein). The components and operations of example robotic arms, end effectors, and EM couplers are discussed in further detail, below.

Figure 2B:
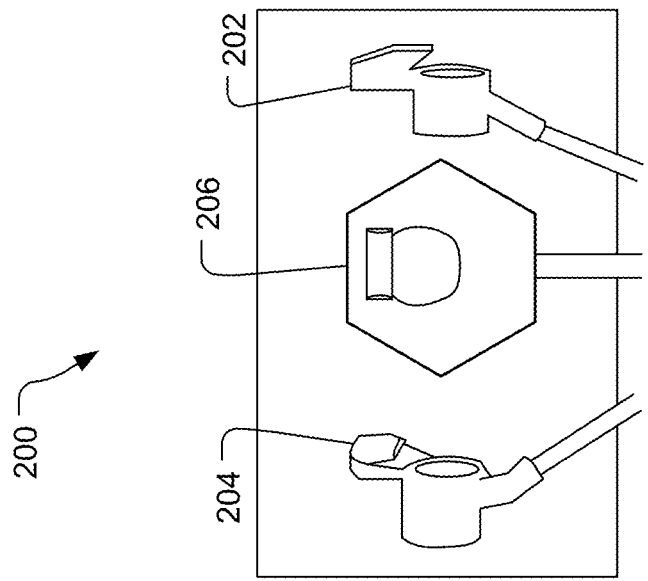
FIGS. 2A-2B depict prior art example trailer connections.
Figure 2A:
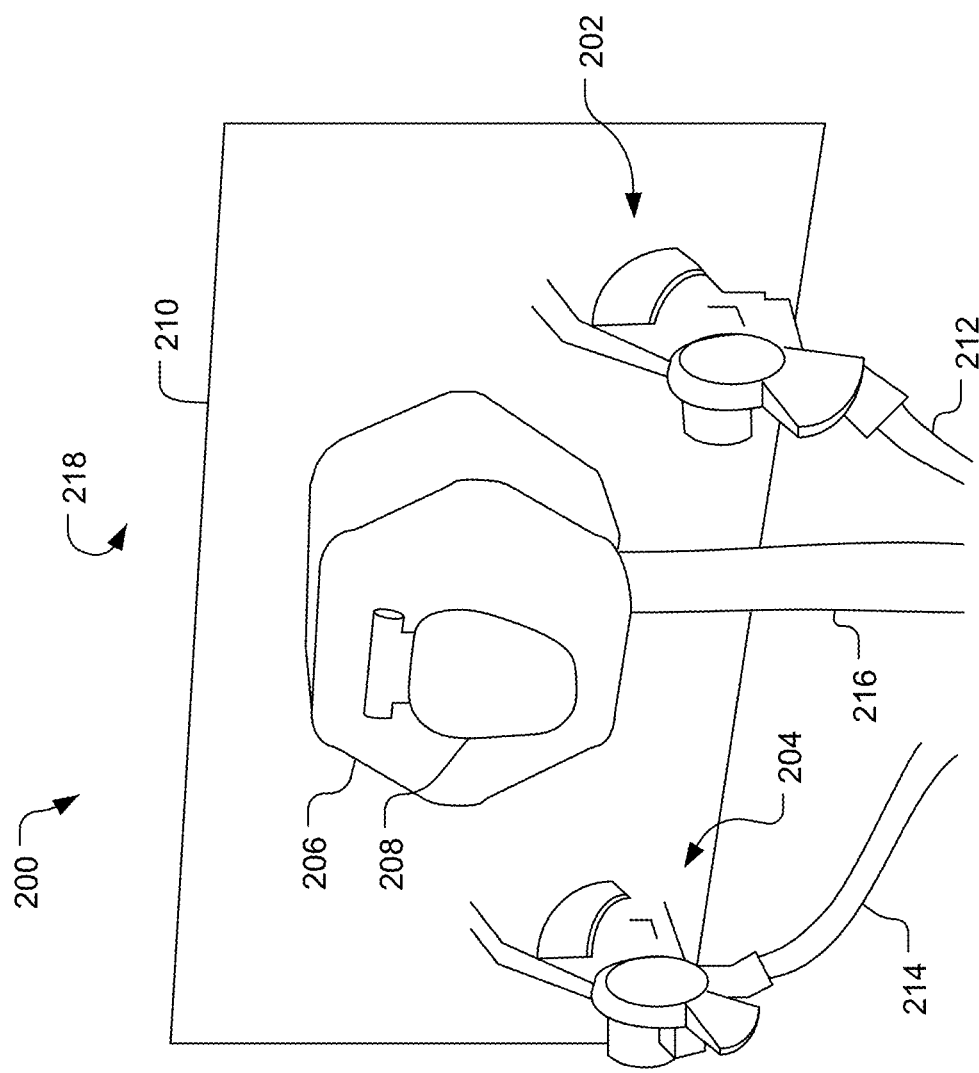

FIGS. 2A-2B depict example prior art trailer connections 200. In particular, FIGS. 2A-2B depict example trailer connections 200 positioned on a front of a trailer 218. The trailer connections 200 may include trailer emergency brake lines, connections that enable movement in tandem, including a power supply, emergency pneumatic brake line, and nominal pneumatic brake line. The perspective view of FIG. 2A and the front view of FIG. 2B include a first gladhand connection site 202, a second gladhand connection site 204, and a power connection site 206 (otherwise referred to as electrical outlet 206). The electrical outlet 206 may include a movable protector (or lid) 208, for safety and to protect the electrical outlet from debris. The trailer connections 200 may be mounted to the trailer 218 with a bracket 210. Each port or site of the trailer connections 200 is coupled to the trailer 226. The first gladhand connection site 202 is coupled to the trailer 226 via a first pneumatic line 212 and the second gladhand connection site 204 is coupled to the trailer 226 via a second pneumatic line 214. The electrical outlet 206 is electrically coupled to the trailer 226 via one or more power lines 216. An electrical plug may from a vehicle may be inserted into the electrical outlet 206 on the trailer 218 to provide power to the trailer 218.

Figure 3A:
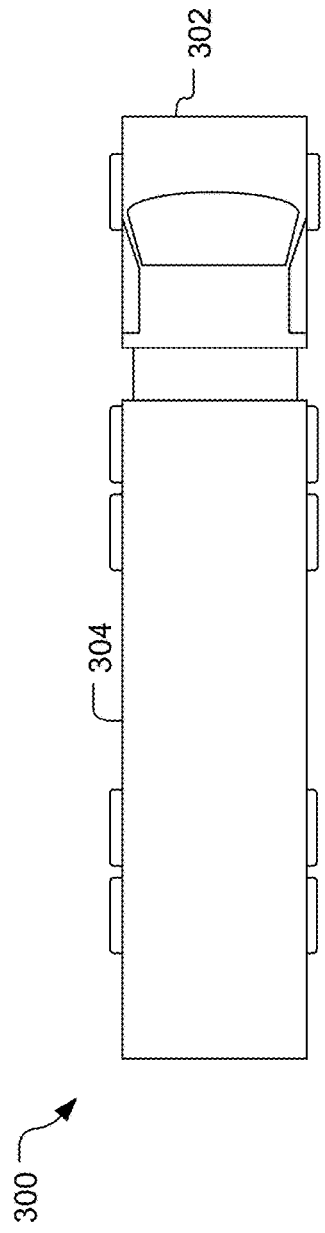
FIG. 3A-3B depict top-down illustrations of a tractor trailer system, including a workspace limited by dynamic operation of the tractor trailer system.
Figure 3B:
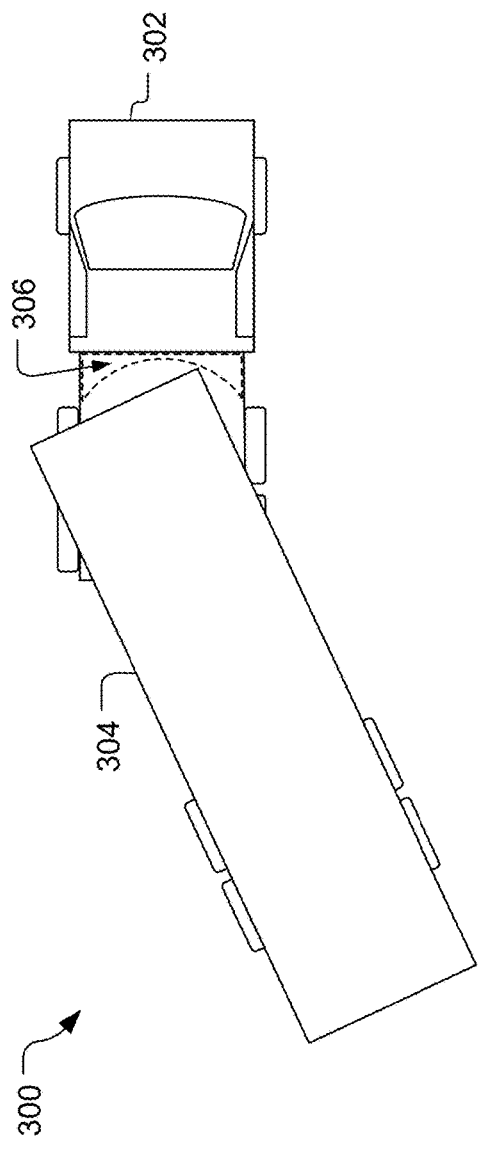

FIG. 3A-3B depict top-down illustrations of a tractor trailer system 300, including a vehicle 302, a trailer 304, and a workspace 306 that is limited by dynamic operation of the tractor trailer system 300. Each tractor trailer system 300 may have different parameters to consider, such as locations of mounted power lines/cables/plugs, gladhands, hoses, and distance between the cab 302 and the trailer 304. Although aspects of this disclosure may be specific to features of a particular trailer 300, it should be appreciated that aspects described herein may be applicable to a variety of tractor trailer systems.

One consideration of the present disclosure is limited workspace 306. Placement of various components may be limited due to the dynamic movements required by the cab 302 and trailer 304. The initial workspace parameters may include a variety of example dimensions, including a 42" distance between the back of the cab 302 and the front of the trailer 304 when the cab 302 and trailer 54 are aligned, and the entire width of the back of the cab 302.

The workspace 306 may be further reduced due to trailer swing shown in FIG. 3B. FIG. 3B shows a top-down illustration of a trailer swing during a turn. Trailer swing occurs as the cab 302 makes a sharp turn. During trailer swing, the back of the trailer sweeps an arc spanning a majority of the space between the cab 302 and trailer 304. This may significantly reduce the allotted working distance (e.g., from 42" to 2") at the center of the cab 302. Because the clearance between the trailer 304 and its chassis may be approximately zero when the trailer swings, a system installed above the rails may be destroyed. Further restrictions to the workspace 306 may include locations of gas tanks on the vehicle, suspension systems of the vehicle, and other attachments to the vehicle.

The workspace 306 shown in FIG. 3B illustrates an unobstructed area (e.g., an area free from collisions) between the cab 302 and the trailer 304 accounting for potential trailer swing. Thus, the workspace 306 indicates a safe zone to mount components of the described technology that is not impacted by trailer swing, constriction by a gas tank, and the suspension system of the vehicle. To the side of the chassis, a modular space may be designated for external generators, step stools, and other components. In an example, this modular space was measured to be 36"×32"×30" in volume.

FIGS. 4A-4B depict example footprint locations of a robotic arm 408 for automated trailer connection and a tool resting rack 410 according to aspects of the present technology. Because trailer swing restricts the workspace 406 near the center of the cab 402, the footprint of the robotic arm 408 may be desired to be positioned towards a side of the cab 402. As shown in FIG. 4A, the footprint of the robotic arm 408 may be near the driver's side of the cab 402 for easy access by a truck operator (e.g., to provide maintenance, switch out an end effector, etc.).

In addition to the footprint of the robotic arm 408, other tools may be desired to be accessible in the workspace 406. For example, the robotic arm may use an end effector that is configured to couple to and operate one or more tools. Different tools may couple to an end effector to provide different functionality, such as EM coupling, gladhand coupling, maintenance tooling, spare tools, etc. An example location for a footprint of a resting rack 410 (e.g., for tools couplable to an end effector of a robotic arm) is shown on the back of the cab 402 in the workspace 406. The footprint of the tool resting rack 410 may be positioned relative to the footprint of the robotic arm 408 to ensure that the robotic arm can reach and utilize the tools on the tool resting rack.

FIGS. 5A-5B depict connector systems 500A, 500B including tools 514 coupled to a tool resting rack 516 on a vehicle 502 and two configurations of an example robotic arm 508 for automated trailer connection. As previously described, the footprint of the robotic arm 508 and the footprint of the tool resting rack 516 and the tools 514 coupled to the tool resting rack 516 may be positioned inside a workspace 506, as shown in FIGS. 5A-5B. As further shown, a first end of the robotic arm 508 may be coupled to a vehicle in a workspace 506 and the opposite end of the robotic arm 508 may be coupled to an end effector 512. The end effector 508 is further described with respect to FIG. 6. The end effector 512 may be couplable to one or more tools 514, which may be secured to the tool resting rack 516. Although the tool resting rack 516 is shown in a specific position on the back of the vehicle 502, any position of the tool resting rack 515 that is within reach of the robotic arm 508 may be used. In an example, a tool couplable to the end effector is an electro-mechanical (EM) coupler. An example EM coupler is further described with respect to FIGS. 7A-7D.

Two configurations of the robotic arm 508 are shown in FIGS. 5A-5B. In FIG. 5A, the connector system 500A shows the robotic arm in an active configuration. An active configuration includes any position of the robotic arm 508 in which the robotic arm 508 is actively engaged in an activity (e.g., coupling to a tool, using a tool, coupling with or interacting with a portion of the trailer, or any other user for the robotic arm) or when any portion of the robotic arm 508 falls outside the workspace 506 (e.g., a portion of the robotic arm may be subject to collision with the trailer in the event of trailer swing). In FIG. 5B, the connector system 500B shows the robotic arm 508 in a resting configuration or parked configuration. The resting configuration or parked configuration may collapse the robotic arm 508 to minimize the area in which the robotic arm 508 exists and contain the entirety of the robotic arm 508 in the workspace 506. The robotic arm 508 may be in the resting position or parked position when not in use and/or when the vehicle is in motion (to avoid being hit by a swinging trailer). The resting configuration or the parked configuration may minimize used space between the vehicle 502 and the trailer, provide better organization, promote safety, etc.

FIGS. 6A-6E depict different perspectives of an example end effector 600 couplable to a robotic arm (e.g., the robotic arm 508 shown in FIGS. 5A-5B). FIG. 6A shows a side view of the end effector 600, FIG. 6B shows a tool end 614 of the end effector 600, FIG. 6C shows a robotic arm end 616 of an end effector 600, FIG. 6D shows a perspective view of the end effector 600, and FIG. 6E shows a cross-section extending between the robotic arm end 616 and the tool end 614 of the end effector 600. As shown in FIGS. 6A-6E, the end effector includes a housing 602, a robotic arm attachment plate 604, a motor 606, a clutch 608, a drive shaft 610, and a mating system 612.

In the example shown, the housing 602 is a skeletal rectangular prism, although any shape or structure of the housing 602 of the end effector 600 is appreciated. The housing 602 provides impact protection to other components of the end effector 600 located inside the housing 602. The housing 602 may be skeletal to minimize weight (thereby reducing exertion and energy required to for the robotic arm to move the end effector 600). The housing 602 may be made of any impact-resistant material. Further consideration may also be given to outdoor durability of a material.

The end effector 600 may also include a robotic arm attachment plate 604, for coupling the end effector to an end of a robotic arm, and a mating system 612, for coupling the end effector to a tool (e.g., an EM coupler). Both the robotic arm attachment plate 604 and the mating system 612 may be capable of removable coupling. The robotic arm attachment plate 604 and the mating system 612 may include features specifically adapted to pair with a coupling component (e.g., an end of the robotic arm, an end of a tool, etc.). Alternatively, the mating system 612 may include universal components to couple to any tool or any set of tools.

The end effector 600, as shown, also includes a motor 606, a clutch 608, and a drive shaft 610. These components may cooperate to allow the end effector to control one or more aspects of a tool coupled to the end effector 600 at the mating system 612. Power to the motor 606 may be provided directly from a vehicle to the end effector 600 or may be provided from the robotic arm (e.g., which may be powered by the vehicle) to the end effector (e.g., via the robotic arm attachment plate 604). Likewise, tools coupled to the end effector 600 may also receive power, such as directly from the vehicle or from the end effector 600.

FIGS. 7A-7D depict an example electro-mechanical (EM) connection system 700 including an electrical outlet 702 (e.g., on a trailer) an electro-mechanical coupler 704 (otherwise referred to as an EM coupler 704). The electrical outlet 702 may include a lid 716 or cover 716 to promote safety and/or protect the integrity of the electrical outlet 702. To access the electrical outlet, the lid 716 is lifted to expose the electrical outlet 702 for insertion of an electric plug 708 into the electrical outlet 702 to provide power to the trailer.

Figure 7B:
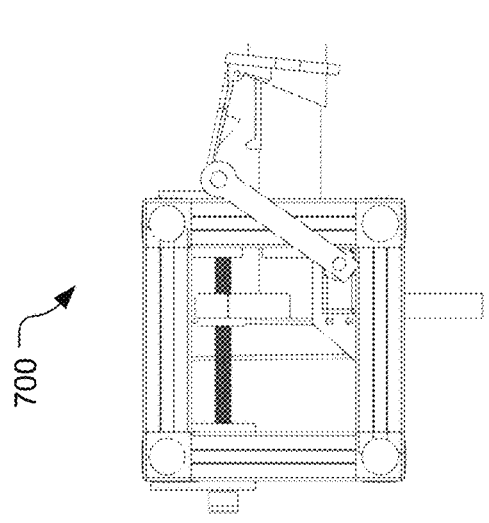
FIGS. 7A-7D depict an example electro-mechanical (EM) coupler system for coupling to an electrical outlet on a trailer.
Figure 7D:
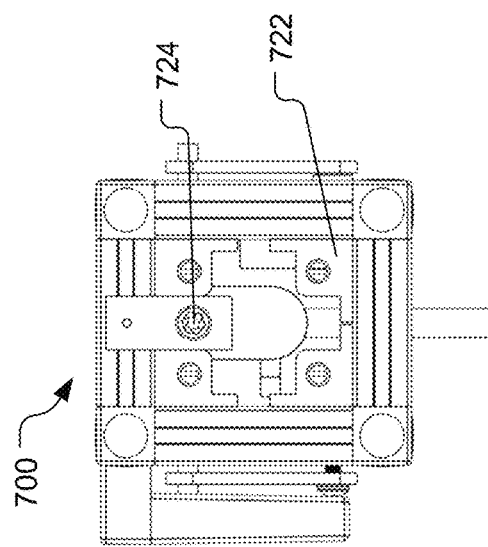
Figure 7A:
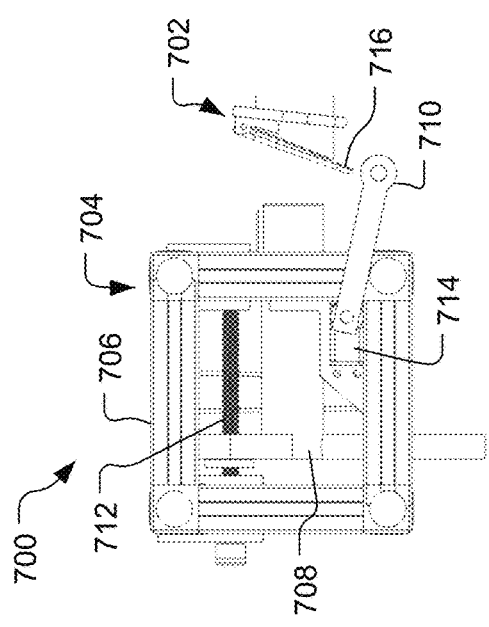
Figure 7C:
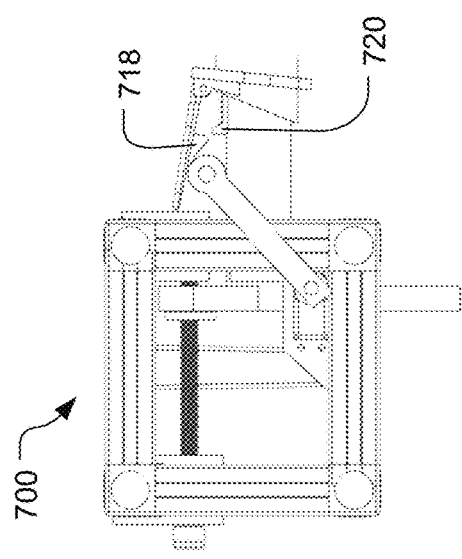

The EM coupler 704 may include a housing 706, an electric plug 708, a lid lifter 710, a lead screw 712, and a servomotor 714 (otherwise referred to herein as a servo 714). The housing 706 of the EM coupler 704 may have similar features to the housing of the end effector described above. The EM coupler 704 may be positioned in three dimensions (e.g., by a robotic arm coupled to an end effector coupled to the EM coupler). The EM coupler 704 may be positioned such that an upward sweeping motion of the lid lifter 710, as may be controlled by the servo 714 intersects with a portion of the lid 716 of the electrical outlet 702 and causes the electrical outlet 702 to be exposed. An example of this positioning is shown in FIGS. 7A and 7B, before and after an upward sweeping motion of the lid lifter 710. After the electrical outlet 702 is exposed (e.g., by lifting the lid 716 with the lid lifter 710), the electrical plug 708 may be advanced toward the electrical outlet 702 and inserted into the electrical outlet 702 to cause a power coupling. The electrical plug 708 may be advanced along the lead screw 712 until an adequate connection/coupling is established. In an example, the coupling is adequate when power provided to the trailer is stable. Alternatively, coupling may be adequate when a locking mechanism is engaged between a tooth 718 on the lid of the electrical outlet 702 and a tooth 720 of the electrical plug 708. The teeth 718, 720 may tensionally couple the electrical plug 708 to the electrical outlet 702 via the tooth 718 on the lid 716.

Power may be provided to the servo 714 (e.g., to lift the lid lifter 710) and rotational force may be provided to the lead screw 712 (e.g., to advance the electrical plug 708) via the coupling with the end effector. The end effector may be coupled to the EM coupler 700 at a receiving plate 722 to provide power to the EM coupler 700 and the servo 714. The lead screw 712 may be rotated at a drive line connector 724 coupling the end effector and the EM coupler 700. The receiving plate 722 and the drive line connector 724 may couple to the end effector at a mating system, such as mating system 612 described in FIG. 6.

Figure 8:
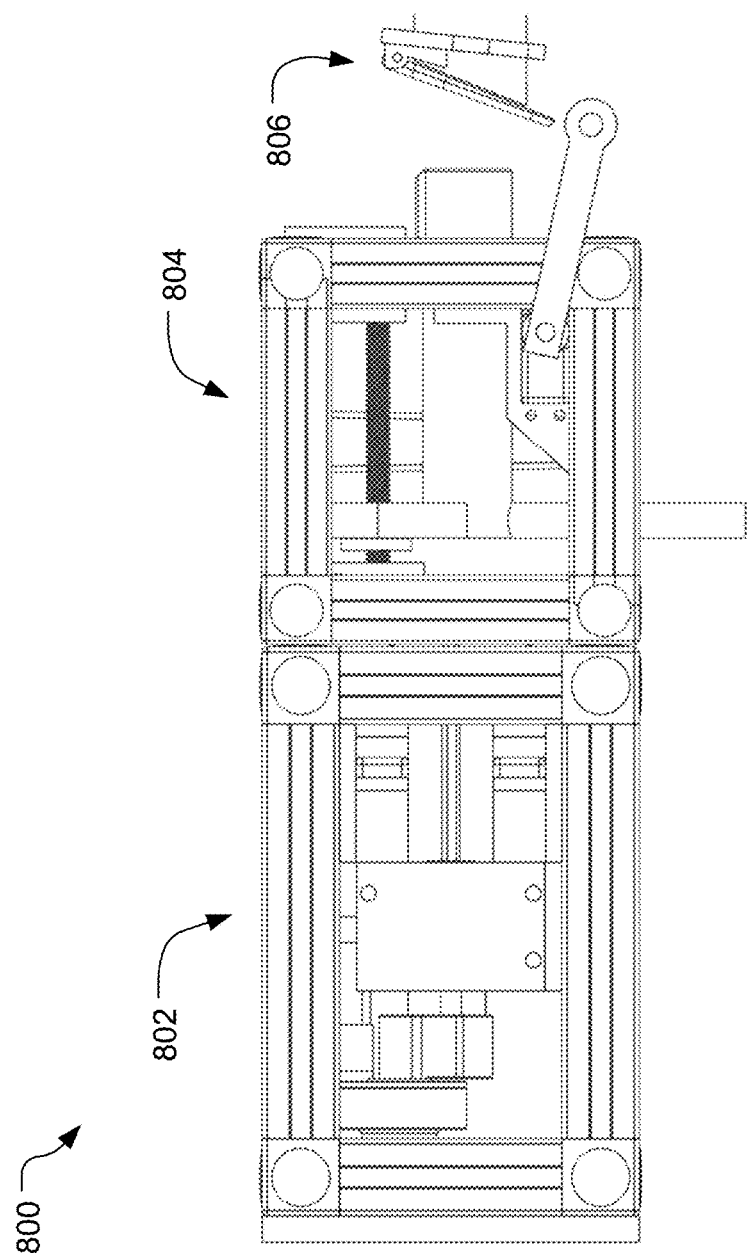
FIG. 8 depicts an end effector coupled to an EM coupler.

FIG. 8 depicts a coupling system 800 including an end effector 802 and an EM coupler 804. In examples, the end effector 802 may be the end effector 600 in FIG. 6 and the EM coupler 804 may be the EM coupler 700 in FIG. 7A-D. An electrical outlet 806 is also shown for reference of an alignment of the coupling system 800. As shown, the end effector 802 is coupled to the EM coupler 804. The coupling between the end effector 802 and the EM coupler 804 allows the end effector to provide power to a servo of the EM coupler and control advancement of the electrical plug of the EM coupler 804 towards the electrical outlet 806. Although not shown, the side of the end effector 802 opposite the coupling of with the EM coupler 804 may couple to a robotic arm or other movement mechanism, such a set of linear actuators as further described in U.S. Provisional Application No. 63/035,089, filed Jun. 5, 2020, the entirety of which is hereby incorporated by reference.

Figure 9:
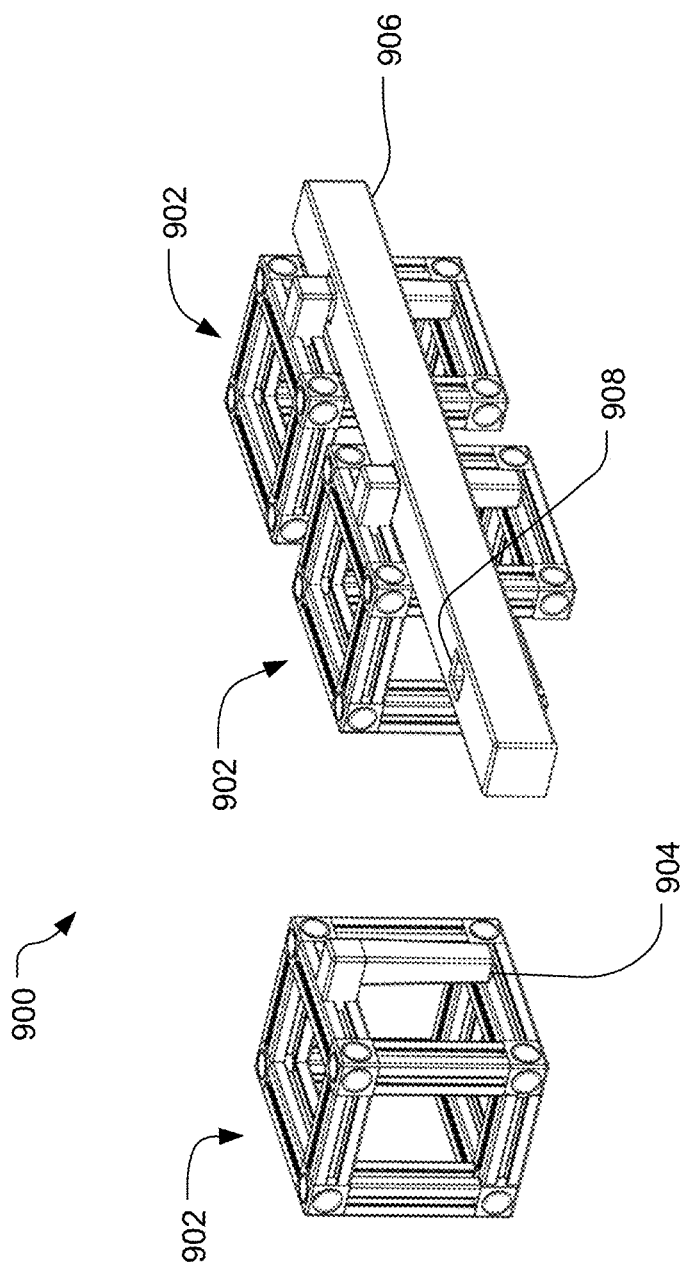
FIG. 9 depicts an example resting rack for tools couplable to an end effector.

FIG. 9 depicts an example tool assembly 900 including tools 902 secured to a tool resting rack 906. As described above, tools secured to the tool resting rack 906 may have a variety of functions, such as a spare, power coupling, pneumatic coupling, etc. Although three tools are shown as removably couplable to the depicted tool resting rack 906, and number of tools may be supported in any configuration (e.g., in a row or otherwise). As shown, a tool 902 couples to the tool resting rack 906 via an insertion element 904 coupled to the housing of the tool 902. The insertion element 904 is insertable into one or more receiving elements 908 on the tool resting rack 906. Although the example shown in FIG. 9 utilizes an insertion element 904 and a receiving element 908, any removable coupling of a tool 902 to a tool resting rack 906 is appreciated, including hook and loop fasteners, a drop box, magnets, etc. In an example, the mechanism for coupling the tool 902 to a tool resting rack 906 may be considered for ease of a robotic arm (or other end effector movement device) to quickly and efficiently couple the tool to an end effector and move the assembly (the end effector and the coupled tool).

Figure 10:
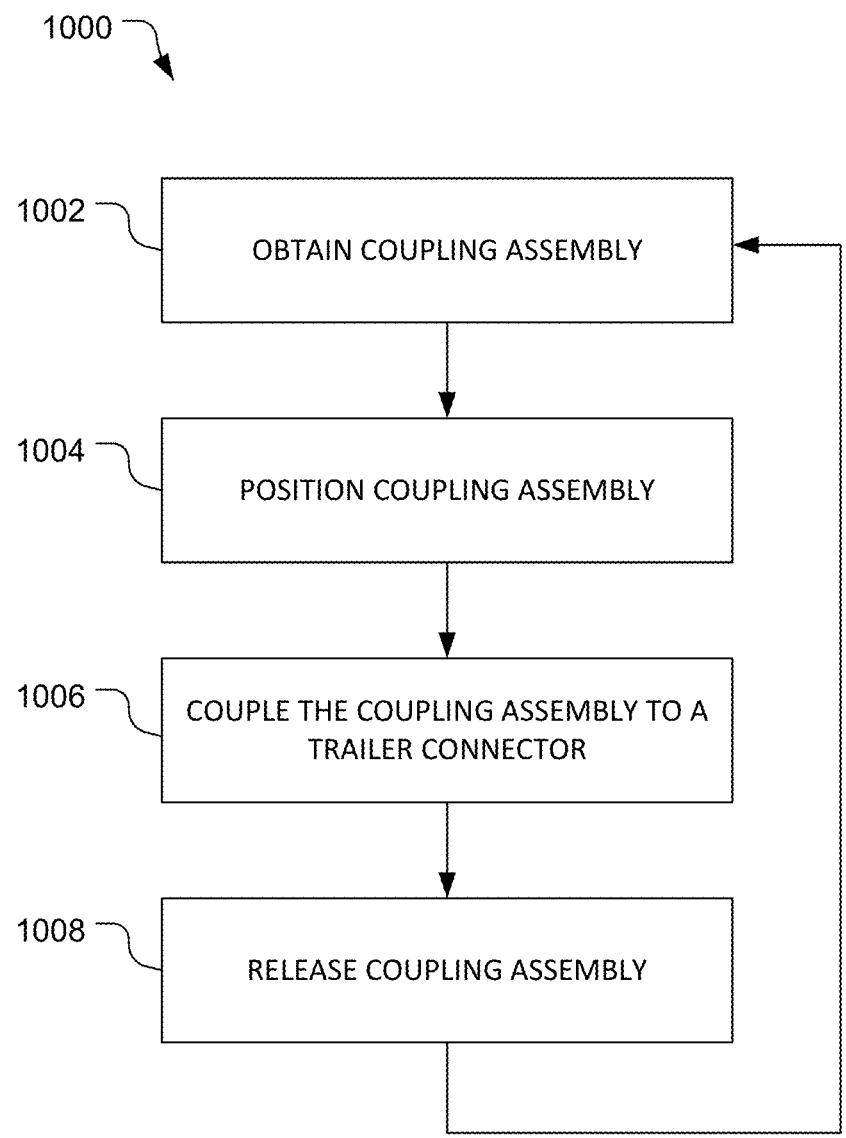
FIG. 10 depicts an example method for automated or semi-automated power coupling of a cab and trailer.

FIG. 10 depicts an example method 1000 for automated or semi-automated power coupling of a cab and a trailer. The method 1000 may be implemented using the technology described herein, including an end effector and an EM coupler. The method 1000 begins at operation 1002 where a coupling assembly is obtained. A robotic arm or other movement device may be coupled to an end effector. The end effector may be positioned by the robotic arm or other movement device to couple the end effector to a tool. As described herein, the tool may be on a tool resting rack and the robotic arm or other movement device may implement specific movement and/or force to decouple the tool from the tool resting rack. For example, if the tool is coupled to the tool resting rack shown in FIG. 9, after the end effector couples to the tool, the tool may be lifted upward to remove an insertion element of the tool from a receiving element of the tool resting rack. The end effector coupled with a tool to be used for coupling (e.g., at a connection of a trailer, such as an EM coupler described herein) may be referred to as a coupling assembly.

At operation 1004, the coupling assembly is positioned. Image processing may be used to identify and locate a trailer connection (e.g., to be coupled with the coupling assembly). After a trailer connection is identified and localized in real-world coordinates, a robotic arm or other movement device may position the end effector and the tool in a coupling position. A coupling position is a position at which control of the tool by the end effector may be used to facilitate a connection between the tool and the trailer connector identified and located. In an example where the tool is an EM coupler, the coupling position may be in any position where the upward swing path of the lid lifter would lift a lid of an electrical outlet to enable insertion of an electrical plug.

At operation 1006, the coupling assembly is coupled to a trailer connector. The end effector may control aspects of the tool such that a connection is established between the tool and the trailer connection. Continuing the example above, if the tool is an EM coupler, the end effector may provide power to the servo of the EM coupler to cause the lid lifter to swing upwards and raise a lid of an electrical outlet. Additionally, the end effector may mechanically control a rotation of a lead screw of the EM coupler to advance an electrical plug into the uncovered electrical outlet. Alternatively, a tool may simply be coupled to a trailer connection by movement and/or rotation of the tool, without further control or manipulation by the end effector. For example, if the electrical outlet did not have a lid and the EM coupler included an extruding electrical plug, the entire coupling assembly could be advanced (e.g., by a robotic arm or other movement device) to insert the electrical plug into the outlet and couple the assembly to the trailer.

At operation 1008, the coupling assembly is released. After the coupling assembly is coupled to the trailer, the robotic arm or other movement device may release the tool and/or the end effector, which remains to be coupled to the trailer. In an example, after coupling the tool with the trailer, a robotic arm may return to a resting configuration or parked configuration as otherwise described herein. The robotic arm may remain in the resting configuration or parked configuration until further action is required or desired, such as decoupling the coupling assembly from the trailer, coupling a different assembly to the trailer, or using another tool. Operations 1002-1008 may repeat as required or desired for coupling and decoupling of any number of assemblies with any number of trailer connectors.

Figure 11:
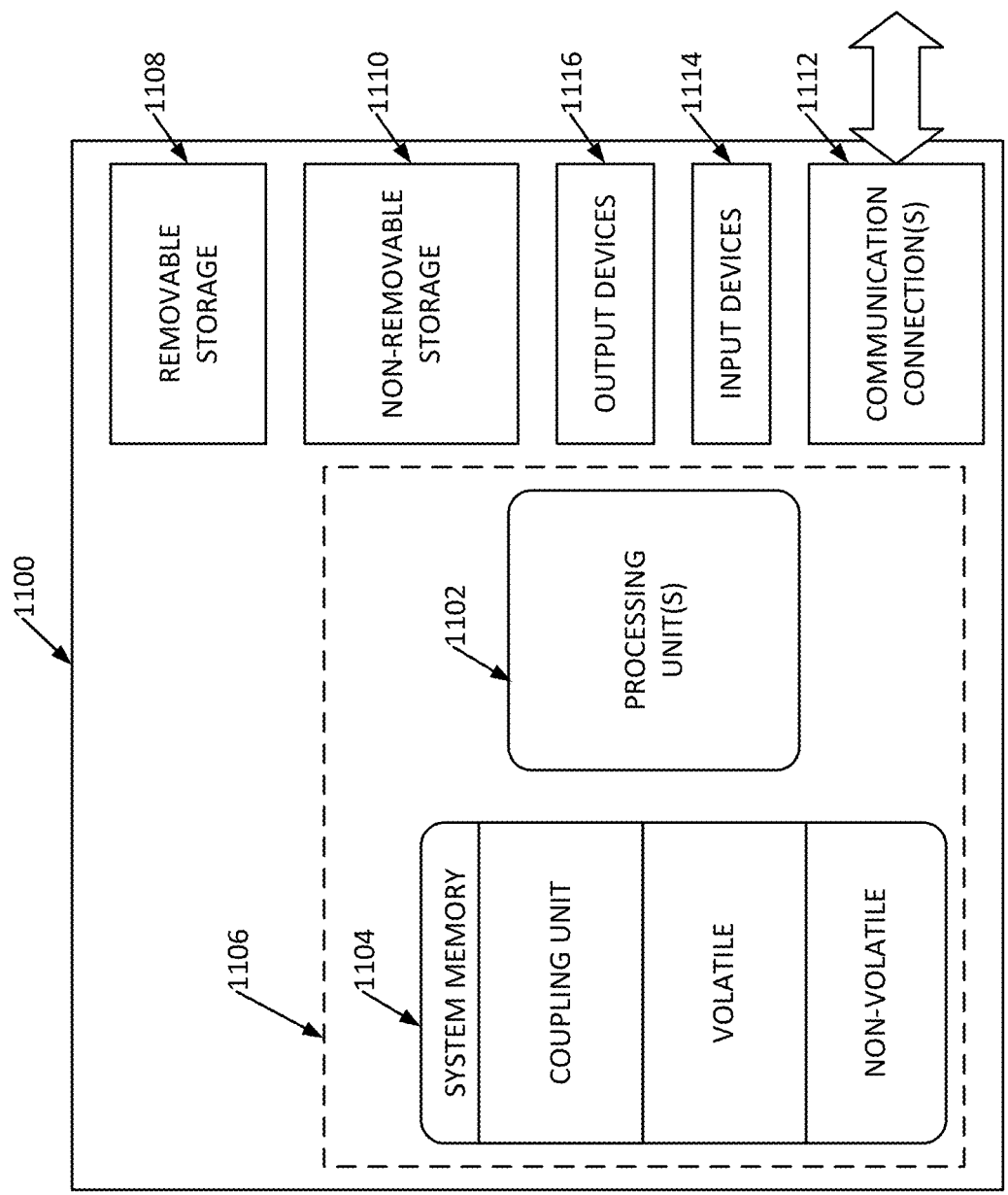
FIG. 11 depicts an example of a suitable control operating environment in which one or more of the present embodiments may be implemented.

FIG. 11 illustrates an example of a suitable operating environment 1100 in which one or more of the present embodiments may be implemented. In examples, operating environment 1100 may be used to control operation of the robotic arm 508 in FIG. 5 or other automated system to control end effector 600 in FIG. 6 and EM coupler 700 in FIG. 7A-D. In addition, operating environment 1100 may cooperate with one or more computer visions systems, such as those described in U.S. Provisional Application No. 63/035,089, filed Jun. 5, 2020, the complete disclosure of which is hereby incorporated herein by reference in its entirety. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1100 typically may include at least one processing unit 1102 and memory 1104. Depending on the exact configuration and type of computing device, memory 1104 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 11 by dashed line 1106. Further, operating environment 1100 may also include storage devices (removable, 1108, and/or non-removable, 1110) including, but not limited to, magnetic or optical disks or tape. Similarly, environment 1100 may also have input device(s) 1114 such as a keyboard, mouse, pen, voice input, etc. and/or output device(s) 1116 such as a display, speakers, printer, etc. Also included in the environment may be one or more communication connections, 1112, such as LAN, WAN, point to point, etc.

Operating environment 1100 may include at least some form of computer readable media. The computer readable media may be any available media that can be accessed by processing unit 1102 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 1100 may be one or more computers operating in a networked environment using logical connections to one or more remote computers. The remote computer may be a personal computer, a server, a router, a network PC, a peer device or other common network node, and typically includes many or all of the elements described above as well as others not so mentioned. In an example, the operating environment may include one or more vehicle controllers and/or processors associated with the vehicle or truck. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

What is claimed is:

1. An electro-mechanical coupler comprising:
   a housing;
   a lead screw inside the housing;
   an electric plug inside the housing movable along the lead screw;
   a servomotor inside the housing; and
   a lid lifter controlled by the servomotor, the lid lifter configured to lift a lid of an electrical outlet.

2. The electro-mechanical coupler of claim 1, wherein movement of the electric plug along the lead screw is controlled from a drive line connector.

3. The electro-mechanical coupler of claim 1, wherein power is provided to the servomotor from a receiving plate of the electro-mechanical coupler, and wherein the receiving plate is electrically coupled to an end effector.

4. The electro-mechanical coupler of claim 1, wherein the housing is a skeletal rectangular prism.

5. The electro-mechanical coupler of claim 1, wherein the electric plug is configured to lock into the lid of the electrical outlet.

6. The electro-mechanical coupler of claim 1, wherein the electric plug is electrically coupled to a vehicle and the electrical outlet is electrically coupled to a trailer.

7. The electro-mechanical coupler of claim 1, wherein the electric plug is movable along the lead screw to extrude outside of the housing.

8. The electro-mechanical coupler of claim 1, wherein the housing includes an insertion element configured to be received at a tool resting rack.

9. An end effector comprising:
   a housing defining a first side and an opposite second side;
   an attachment plate positioned at the first side capable of coupling with a movement device;
   a mating system positioned at the second side capable of removably coupling with a tool;
   a motor inside the housing;
   a clutch inside the housing coupled to the motor; and
   a drive shaft inside the housing coupled to the motor, the drive shaft extending from the clutch to a position at the second side to selectively engage the tool.

10. The end effector of claim 9, wherein the movement device is a robotic arm.

11. The end effector of claim 10, wherein the robotic arm is coupled to a vehicle.

12. The end effector of claim 10, wherein power is provided from the robotic arm to the end effector via the attachment plate.

13. The end effector of claim 9, wherein the mating system provides power to the tool.

14. The end effector of claim 9, wherein the mating system enables control of a feature of the tool.

15. A power coupling assembly, comprising:
   an electro-mechanical coupler including:
      a first housing;
      a lead screw inside the first housing;
      an electric plug inside the first housing movable along the lead screw;
      a servomotor inside the first housing; and
      a lid lifter controlled by the servomotor, the lid lifter configured to lift a lid of an electrical outlet; and
   an end effector including:
      a second housing with a first side;
      a mating system positioned at the first side capable of coupling with the electro-mechanical coupler; and
      a motor inside the second housing controlling a drive shaft.

16. The power coupling assembly of claim 15, wherein power is provided from the end effector to the electro-mechanical coupler.

17. The power coupling assembly of claim 15, wherein the drive shaft is rotatably coupled to the lead screw via the mating system.

18. The power coupling assembly of claim 15, wherein movement of the electric plug along the lead screw is based on the motor of the end effector.

19. The power coupling assembly of claim 18, wherein movement of the electric plug along the lead screw is controlled to insert the electric plug into the electrical outlet.

20. The power coupling assembly of claim 15, wherein the lid lifter is movable in an upward swing to lift the lid of the electrical outlet.

* * * * *